April 19, 1960     A. J. PRITCHARD ET AL     2,933,336

AUTOMOTIVE BALL JOINT SUSPENSION KIT

Filed July 23, 1958

ARNOLD J. PRITCHARD
WILLARD A. ROWLETT
*INVENTORS*

ATTORNEY

United States Patent Office 2,933,336
Patented Apr. 19, 1960

2,933,336

AUTOMOTIVE BALL JOINT SUSPENSION KIT

Arnold J. Pritchard, Carnegie, and Willard A. Rowlett, Bethany, Okla.

Application July 23, 1958, Serial No. 750,508

2 Claims. (Cl. 287—90)

The present invention relates to automotive accessories and more particularly to a repair kit for a ball joint wheel suspension assembly.

Most ball joint suspension assemblies have a common fault, namely that of a certain degree of looseness of fit between the housing or socket and the ball forming the joint. This looseness is occasioned during the manufacturing of the component parts of the joints in that when the housing which is formed of two units, one being a stamping and the other a machine and heat-treated unit, is assembled the tolerance of desired fit cannot be kept to the desired minimum. Therefore, in all such assemblies some such looseness is present which may amount to $1/16$ of an inch or more between mating parts. Even new automobiles using such wheel suspension connections have been found to have undesired looseness of fit. At these critical points an accurate, snug-fitting connection is imperative in front wheel suspension to eliminate excessive tire wear by continual caster and camber changes; to prevent road wander of the vehicle; to eliminate front wheel shimmy at speeds from 50 to 60 miles per hour on curves; and, to eliminate canting of the front wheels.

It is, therefore, the principal object of the present invention to provide a supplemental or repair kit which may be installed on or in connection with a ball and socket suspension joint which will maintain a uniform tension on the joint assembly at all times regardless of the looseness between the original parts forming the joint.

Another object is to provide a ball joint repair kit of this class which will hold or maintain the ball joint assembly in a predetermined aligned position under all driving conditions and yet which will permit freedom of movement of the ball joint.

An additional object is to provide a device of this class which is adaptable for use on most automotive vehicles using ball joint wheel suspension assemblies.

Still another object is to provide a kit of this character which is durably constructed and which will last out the remainder of the life of the vehicle and which needs no further attention after being installed.

Yet another object is to provide a ball joint repair which will act to prevent looseness or play between the ball of the ball joint and its seat when the front end of the vehicle is relieved of its weight, or a portion of its weight.

A further object is to provide a repair means for ball joint suspension assemblies which will hold or maintain accurate front end alignment by eliminating looseness and play by directing all tension within the joint toward or against the originally designed bearing surfaces.

The present invention accomplishes these and other objects by providing a helical tapered spring adapted to surround a shank of a ball joint stud between its connection with a wheel steering knuckle and the ball joint housing connected to the distal end of a load supporting arm. A retaining member supports one end of the spring on the outer surface of the ball joint housing while a washer-like seat in contact with the wheel steering knuckle nests the opposing end of the spring.

Other objects will be apparent from the following description when taken in conjunction with the accompanying single sheet of drawings, wherein.

Like characters of reference designate like parts in those figures of the drawings in which they occur.

In the drawings.

Figure 1:
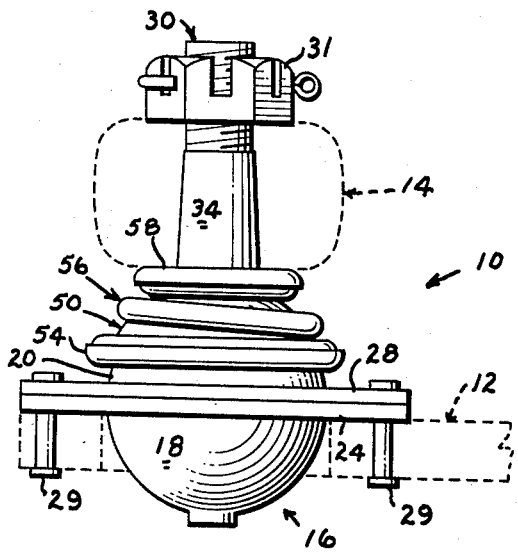
Figure 1 is an elevational view of the device in operating position on a ball joint assembly, illustrating in dotted lines, its connection with a steering knuckle and a load supporting arm.

The reference numeral 10 indicates, as a whole, a ball and socket joint as is presently employed for connecting the distal end portion 12 of a load supporting arm to the steering knuckle or member 14 forming a part of a wheel spindle, not shown. Two such ball and socket joints 10 are normally used in connecting each wheel to the forward end of an automotive vehicle for forming a front end suspension system. The ball and socket joint 10 comprises a divided housing 16 including a lower half 18 and an upper half 20. The housing lower half 18 is formed to define a substantially hemispherical inner bearing surface 22 having a flanged edge 24. The opposite or top half 20 of the housing is formed substantially identical with respect to the lower half 18 to form a segmental spherical inner bearing surface 26 and a flanged edge 28 in flat cooperating contact with the flange 24 which forms the equatorial region of the housing or socket. A ball stud 30 has a ball end 32 which is co-operatingly nested by the inner spherical walls 22 and 26 of the housing 16 and includes a shank end 34 projecting outwardly of the housing 16 through a suitable opening 36 formed in the polar region of the housing half 20. Diametrically the opening 36 is preferably substantially greater than the shank 34 to permit freedom of lateral movement of the latter. The housing flanges 24 and 28 are secured together, as by riveting or spot welding, thus forming, with the ball stud 30, an integral ball joint unit. The flanged edges of the housing are connected, as by rivets 29, to the distal end of the load supporting arm 12 of the vehicle while the shank 34 is extended through a suitable aperture in the steering knuckle 14 of the wheel support structure. The shank 34 preferably tapers outwardly toward its end opposite the ball end 32 and threadedly receives a nut 31 to form a rigid connection with the steering knuckle 14. The above description of component parts numbered 10 through 36 are more or less conventional with a number of popular makes of automotive vehicles and is described herein only to set forth a workable combination with which the instant invention is designed to operate.

Figure 2:
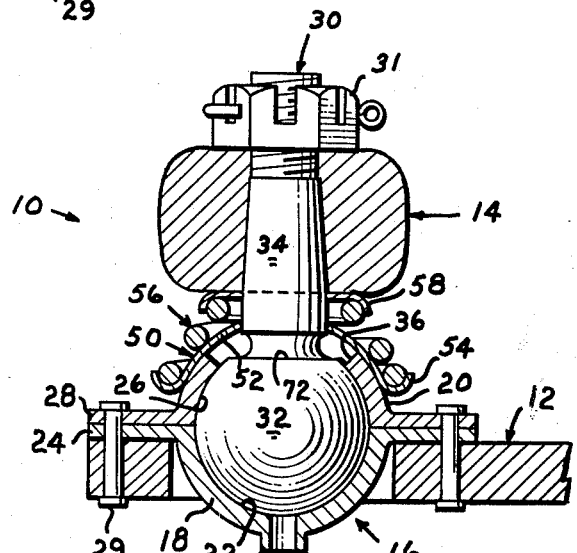
Figure 2 is a vertical cross-sectional view of the device as seen in Fig. 1; and, Figure 3 is a fragmentary cross-sectional view illustrating an alternate arrangement of the device.

In carrying out the invention, and referring more particularly to Figs. 1 and 2, a spring retaining member 50 having a segmental spherical or inverted cup-shaped wall 52 formed with the inner surface thereof for co-operative contiguous contact with the outer spherical surface of the upper housing half 20 is placed upon the latter. The member 50 is provided with a central aperture slightly greater diametrically than the diameter of the shank 34 which projects therethrough. The member 50 extends from the polar region of the housing 20, through which the shank 34 projects, toward the flange 28 but terminates in an annular flange portion 54 short of contact with the flange 28. Thus, the member 50 is kept coaxially aligned with the shank while the housing pivots on the ball. The annular flange 54 is arcuate in cross section, as may be seen in Fig. 2, and opens upwardly toward the shank 34.

A helical tapered spring 56 is interposed between the steering knuckle 14 and the ball housing half 20 around the shank 34. Diametrically the large end of the spring 56 is such that it is co-operatively received and retained by the annular flange 54. The opposite or small end of the spring 56 is received by a washer-like member 58 which surrounds the shank 34 and flatly contacts the steering knuckle 14 and is equipped with an annular flanged periphery to prevent lateral movement of the small end of the spring relative to the shank. The spring 56 is preferably designed so that, when installed as described hereinabove and shown in the drawings, it will be under a comparatively heavy load, on the order of 250 p.s.i., and thus exert a force against the steering knuckle 14 and the ball housing 16 which urges the hemispherical portion of the ball end adjacent the shank toward substantially constant operative bearing contact with the inner surface of the housing half 20 when the front end of the vehicle is relieved of its weight. Therefore the play or looseness present between the spherical surface of the ball end 32 and the co-operating bearing surface of the housing will be confined to the polar region of the ball end opposite the shank 34. In other words the spring 56 serves to hold the ball 32 upward out of contact with the housing half 18 and in contact with the housing half 20 when the weight of the vehicle is off or partially off of the ball joint connection. For example, when driving at high rates of speed the forward end of the vehicle is relieved of a portion of its weight due to momentum, torque and other factors which permits the looseness of fit between the parts of the ball joints, as mentioned hereinabove, to become quite evident in wheel shimmy, resulting in tire wear, and road wandering of the vehicle. Thus, the device functions to maintain the predetermined aligned position of the wheels when the vehicle weight is relieved from the front wheels to the extent that the load bearing surfaces between the ball and its socket are parted.

Constant movement or the reciprocating action of the load supporting arm 12 relative to the ball stud 30 moves or slides the outer surface of the housing half 20 relative to the co-operating inner surface of the spring retaining member 50. Therefore it is desirable that the member 50 be case hardened, as by gas carburizing, to provide a surface thereon which is preferably approximately five points above or below the hardness of the housing half 20 as measured on the Rockwell hardness scale. The member 50 is thereafter cadmium plated thus providing mating or bearing surfaces between the member 50 and the housing 20 which will not "gald." The washer-like member 58 is similarly treated in this manner.

Figure 3:
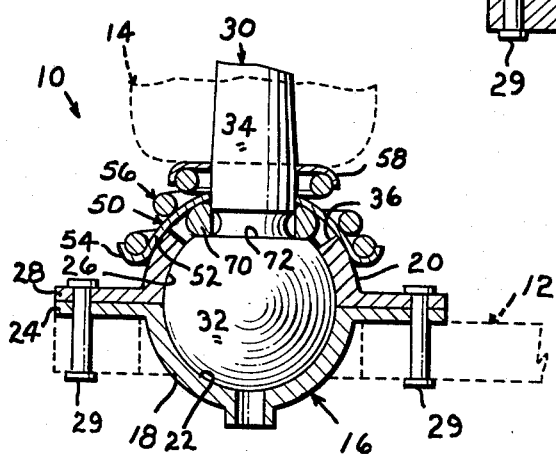

Referring now in detail to Fig. 3 it may be seen that the device is installed in a manner similar to that described for Fig. 2 and that an annular ring 70 has been interposed between the inner surface of the spring retaining member 50 and the adjacent polar region of the ball end 32 surrounding the shank 34. The ring 70 is seated on a shoulder 72 formed on the ball 32 and the inside diameter of the ring 70 forms a cylindrical-like wall of a size such that it closely receives the shank 34 therethrough. Cross sectionally the ring 70 is of such size that it is substantially equal to the spacing between the inner surface of the member 50 and the shoulder 72 when the member 50 is in contiguous contact with the outer surface of the housing 20. Thus, the small area occupied by the cross sectional area of the ring 70 does not reduce the required spacing between the shank 34 and the peripherial edge of the housing 20 defining the opening 36. The purpose of the ring 70 is to eliminate looseness between the ball 32 and its seat on the inner surface of the lower housing half 18 in those installations in which the ball is seated within the lower housing. In other words the member 50, being seated upon the outer surface of the housing 20 by the resilience of the spring 56, acts to prevent movement of the ball 32 relative to its socket or seat by the ring 70 being in contact with the member 50 and the shoulder 72. This action is only effective when the ball joint is relieved of a portion of the vehicle weight as is explained hereinabove for the installation as illustrated in Fig. 2.

Obviously the invention is susceptible to some change or alteration without defeating its practicability, and we therefore do not wish to be confined to the preferred embodiment shown in the drawings and described herein, further than we are limited by the scope of the appended claims.

We claim:

1. In a repair kit for stabilizing a suspension ball and socket joint which connects a steering knuckle to the distal end of a load supporting arm wherein said joint includes a housing having a segmental spherical outer and inner wall and a stud having a ball end portion adapted for bearing engagement with the inner spherical wall of the housing, said stud having a shank end portion integral with the ball end portion and extending outwardly of the housing, opposite the connection of the latter with said arm, through an opening of greater diameter than said shank for connection with said steering knuckle, said stud having an annular shoulder defining the juncture of said shank with said ball end, the improvement which comprises: an inverted cup-shaped spring retaining member coaxially surrounding said shank and having an inner surface engaging the adjacent outer spherical surface of said housing, said spring retaining member having an annular flange, arcuate in cross section, formed by its depending edge portion and facing toward said steering knuckle; a ring surrounding the shank of said stud in contact with the shoulder adjacent the ball end portion, said ring having a cylindrical inner wall surface in contact with said shank and having an arcuate outer surface contacting the inner surface of said spring retaining member; and a heavy loaded tapered helical compression spring coaxially surrounding the shank of said stud and interposed between said steering knuckle and the flange on said spring retaining member in contactable relation with respect to the outer arcuate surface of the latter.

2. In a repair kit for stabilizing a suspension ball and socket joint which connects a steering knuckle to the distal end of a load supporting arm wherein said joint includes a housing having a segmental spherical outer and inner wall and a stud having a ball end portion for bearing engagement with the inner spherical wall of the housing, said stud having a shank end portion integral with the ball end portion and extending outwardly of the housing, opposite the connection of the latter with said arm, through an opening of greater diameter than said shank for connection with said steering knuckle, said stud having an annular shoulder defining the juncture of said shank with said ball end, the improvement which comprises: a relatively thin walled inverted cup-shaped spring retaining member having an aperture contiguously surrounding the shank of said stud and having an inner wall surface engaging a portion of the adjacent outer spherical wall surface of said housing for pivoting movement with said stud with respect to the housing, said spring retaining member having an annular flange, arcuate in cross section, formed by its depending edge portion and facing toward said steering knuckle; a ring surrounding the shank of said stud in contact with the shoulder adjacent the ball end portion, said ring having a cylindrical inner wall surface in contact with said shank and having an arcuate outer surface contacting the inner surface of said spring retaining member; and a heavy loaded tapered helical compression spring coaxially surrounding the shank of said stud and interposed between said steering knuckle and the flange on said spring retaining member in contactable relation with respect to the outer arcuate surface of the latter.

References Cited in the file of this patent

UNITED STATES PATENTS

| | | |
|---|---|---|
| 1,845,697 | Baker | Feb. 16, 1932 |
| 1,957,002 | Searles | May 1, 1934 |
| 2,048,803 | Marles | July 28, 1936 |
| 2,200,643 | Smith | May 14, 1940 |
| 2,761,695 | Graham | Sept. 4, 1956 |